United States Patent
Parkinson et al.

(10) Patent No.: US 12,149,528 B2
(45) Date of Patent: Nov. 19, 2024

(54) AUTHENTICATING DEVICES VIA TOKENS AND VERIFICATION COMPUTING DEVICES

(71) Applicant: Allstate Insurance Company, Northbrook, IL (US)

(72) Inventors: John Parkinson, Burlington, VT (US); Jason Park, Chicago, IL (US); David Harris, Wheaton, IL (US)

(73) Assignee: Allstate Insurance Company, Northrook (IL)

( * ) Notice: Subject to any disclaimer, the term of this patent is extended or adjusted under 35 U.S.C. 154(b) by 0 days.

(21) Appl. No.: 18/470,518

(22) Filed: Sep. 20, 2023

(65) Prior Publication Data
US 2024/0015150 A1 Jan. 11, 2024

Related U.S. Application Data

(63) Continuation of application No. 17/339,072, filed on Jun. 4, 2021, now Pat. No. 11,811,754, which is a
(Continued)

(51) Int. Cl.
*H04L 29/06* (2006.01)
*G06F 16/27* (2019.01)
(Continued)

(52) U.S. Cl.
CPC .......... *H04L 63/0853* (2013.01); *G06F 16/27* (2019.01); *G06F 21/44* (2013.01); *H04L 9/0869* (2013.01); *H04L 9/3234* (2013.01)

(58) Field of Classification Search
CPC . H04L 63/0853; H04L 9/3234; H04L 9/0869; G06F 17/30575; G06F 21/44
(Continued)

(56) References Cited

U.S. PATENT DOCUMENTS 6,687,375 B1 2/2004 Matyas, Jr. et al.
7,111,172 B1 * 9/2006 Duane ................ H04L 63/04
380/278
(Continued)

FOREIGN PATENT DOCUMENTS

| CN | 108259502 A | 7/2018 |
| WO | 2015018249 A1 | 2/2015 |
| WO | 2017127883 A1 | 8/2017 |

OTHER PUBLICATIONS

Hasini Gunsinghe et al., "Privacy Preserving Biometrics-Based and User Centric Authentication Protocol" Purdue Wniversity; https://docs.lib.purdue.edu/cgi/viewcontent.cgi?referer=https://www.google.co.in/&httpsredir=1&article=1635&context=ccpubs 2014, pp. 1-21.
(Continued)

*Primary Examiner* — Haresh N Patel
(74) *Attorney, Agent, or Firm* — Akerman LLP

(57) ABSTRACT

Aspects of the disclosure relate to a system and method for securely authenticating a device via token(s) and/or verification computing device(s). A verification computing device may generate a pseudorandom number or sequence. Based on the pseudorandom number or sequence, the verification computing device may select a first plurality of parameters associated with a user of a device to be authenticated. The verification computing device may transmit, to the device, the pseudorandom number or sequence, and the device may select a second plurality of parameters. The device may generate a token based on the second plurality of parameters. The device may send the token to another device, and the other device may send the token to the verification computing device. The verification computing device may authenticate the device based on the token.

20 Claims, 6 Drawing Sheets

Related U.S. Application Data continuation of application No. 16/134,247, filed on Sep. 18, 2018, now Pat. No. 11,044,244.

(51) Int. Cl.
   *G06F 21/44* (2013.01)
   *H04L 9/08* (2006.01)
   *H04L 9/32* (2006.01)
   *H04L 9/40* (2022.01)

(58) Field of Classification Search
   USPC .......................................................... 726/9
   See application file for complete search history.

(56) References Cited

U.S. PATENT DOCUMENTS

| | | | |
|---|---|---|---|
| 7,784,684 B2 | 8/2010 | Labrou et al. | |
| 8,180,891 B1* | 5/2012 | Harrison | H04L 61/5007 709/224 |
| 8,752,146 B1 | 6/2014 | Van Dijk et al. | |
| 8,892,697 B2 | 11/2014 | Nema | |
| 8,943,311 B2 | 1/2015 | Ronda et al. | |
| 9,424,574 B2 | 8/2016 | Bondesen et al. | |
| 2007/0174348 A1* | 7/2007 | Abellan Sevilla | G06F 16/275 |
| 2009/0006263 A1* | 1/2009 | Power | G06Q 20/085 705/65 |
| 2009/0125997 A1* | 5/2009 | Cook | H04L 63/0853 726/6 |
| 2009/0328165 A1 | 12/2009 | Cook et al. | |
| 2011/0231912 A1* | 9/2011 | Lee | H04L 9/3213 726/7 |
| 2011/0270750 A1* | 11/2011 | Abrams, Jr. | G06Q 20/354 705/41 |
| 2014/0136419 A1 | 5/2014 | Kiyohara | |
| 2014/0157393 A1 | 6/2014 | Whitcomb | |
| 2014/0229388 A1 | 8/2014 | Pereira et al. | |
| 2014/0269666 A1* | 9/2014 | Marsh | H04L 27/2613 370/350 |
| 2014/0351595 A1 | 11/2014 | Blom et al. | |
| 2014/0373753 A1 | 12/2014 | Cornick et al. | |
| 2015/0213435 A1* | 7/2015 | Douglas | G06Q 20/425 705/64 |
| 2015/0304110 A1* | 10/2015 | Oberheide | H04L 9/3215 713/155 |
| 2015/0347552 A1* | 12/2015 | Habouzit | G06F 16/178 707/613 |
| 2016/0034357 A1* | 2/2016 | Anglin | G06F 11/2028 714/4.11 |
| 2016/0134599 A1* | 5/2016 | Ross | H04L 63/0815 713/168 |
| 2016/0197902 A1 | 7/2016 | Tunnell et al. | |
| 2016/0205089 A1 | 7/2016 | Ott et al. | |
| 2016/0227265 A1* | 8/2016 | Harrison | H04L 63/10 |
| 2016/0373451 A1 | 12/2016 | Gbadegesin et al. | |
| 2017/0099278 A1* | 4/2017 | Ducatel | G06F 21/31 |
| 2017/0177855 A1 | 6/2017 | Costa Faidella et al. | |
| 2017/0221059 A1 | 8/2017 | Sethi | |
| 2017/0359313 A1* | 12/2017 | Livneh | H04L 63/0414 |
| 2018/0129816 A1* | 5/2018 | Schmidt | H04L 63/0272 |
| 2018/0268414 A1* | 9/2018 | Chung | G06Q 20/409 |
| 2018/0285546 A1* | 10/2018 | Greenberg | H04L 9/0891 |
| 2018/0336554 A1* | 11/2018 | Trotter | H04L 63/0853 |
| 2018/0341937 A1* | 11/2018 | Kim | G06Q 20/3829 |
| 2019/0172060 A1* | 6/2019 | Wettan | G06Q 20/3821 |
| 2019/0261028 A1* | 8/2019 | Reynolds | H04N 21/2347 |
| 2019/0349342 A1* | 11/2019 | D'Ercoli | H04W 12/63 |
| 2020/0092283 A1* | 3/2020 | Parkinson | H04L 63/0807 |

OTHER PUBLICATIONS

Shkodran Gerguri "Biometrics Used for Random Number Generation" Masaryk University Faculty of Informatics, https://is.muni.cz/th/ewltm/thesis.pdf Spring 2008, pp. 1-54.

Rohan Kulkarni et al., "One-Time Biometric Token based Authentication" International Institute of Information Technology https://cdn.iiit.ac.in/cdn/cvit.ilit.ac.in/images/ConferencePapers/2014/Rohan2014One Time.pdf websited Visited Aug. 29, 2018, pp. 1-7.

Andrew B.J. Teoh et al., "Cancellable biometrics featuring with tokenised random number" Faculty of Information Science and Technology, Multimedia University http://sci-hub.tw/10.1016/j.patrec.2004 .11.021, Sep. 30, 2004,t>ages 1-7.

Andrew B.J. Teoh et al., "Random Multispace Quantization as an Analytic Mechanism for BioHashing of Biometric andRandom Identity Inputs" IEEE Transactions on Pattern Analysis and Machine Intelligence, vol. 28, No. 12 Dec. 2006, http://sci-hub.tw/10.1109/tpami.2006.250 pp. 1-10.

International Search Report & Written Opinion—PCT/US19/51471 Dec. 4, 2019, pp. 1-11.

(US) Non-Final Office Action—U.S. Appl. No. 16/134,247 Aug. 18, 2020.

(US) Final Office Action—U.S. Appl. No. 16/134,247 Dec. 17, 2020.

(US) Notice of Allowance—U.S. Appl. No. 16/134,247 Feb. 24, 2021.

\* cited by examiner

AUTHENTICATING DEVICES VIA TOKENS AND VERIFICATION COMPUTING DEVICES

CROSS-REFERENCE TO RELATED APPLICATIONS

This application is a continuation of U.S. patent application Ser. No. 16/134,247, filed Sep. 18, 2018, now, U.S. Pat. No. 11,044,244, which is a continuation of U.S. patent application Ser. No. 17/339,072, filed Jun. 4, 2021, which is incorporated herein by reference in its entirety.

TECHNICAL FIELD

Aspects of the disclosure generally relate to generating tokens to authenticate user devices via one or more verification computing devices.

BACKGROUND

Users may desire to use their device(s), such as a smartphone or a laptop computer, to perform one or more activities with other devices or users of those other devices. A user may encrypt information used for the activity and send the encrypted information to the other device, and the other device may authenticate the user based on the information. However, various network and identity security issues may be present under these scenarios. For example, a spoofing attack may be used to copy the user's information and attempt to perform a fraudulent activity with the other device, which may perceive that the information is coming from the user. A bad actor may hack into the user's device or intercept messages transmitted between the user's device and the other device in order to obtain the user's information. The bad actor may be able to imitate the user and perform activities as the user.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure relate to a computing device, apparatus, system, and/or method comprising generating, by a verification computing device, a pseudorandom sequence. Based on the pseudorandom sequence, the verification computing device may select, from a first database, a first plurality of parameters associated with a user. The method may comprise transmitting, to a first device associated with the user, the pseudorandom sequence for the first device to select a second plurality of parameters from a second database. The verification computing device may receive, from a second device, a token generated by the first device based on the second plurality of parameters. Based on the token, the first device may be authenticated.

In some examples, the token may comprise a first token, and the verification computing device may generate a second token based on the first plurality of parameters. Authenticating the first device may be based on a comparison between the first token and the second token.

In some examples, after authenticating the first device, the method may comprise transmitting, to the first device, first information indicating the first device is authenticated. Second information indicating the first device is authenticated may be transmitted to the second device. Additionally or alternatively, an instruction for the first device to transmit the first information to the second device may be transmitted to the first device.

Is some examples, the method may comprise synchronizing parameters associated with the user stored in the first database with parameters associated with the user stored in the second database. Additionally or alternatively, the method may comprise updating one or more of the first database or the second database with one or more of the token, metadata generated during authentication of the first device, or transaction information between the first device and the second device.

In some examples, the verification computing device may decode the token received from the second device to generate a third plurality of parameters. Authenticating the first device may be based on a comparison of the third plurality of parameters to the first plurality of parameters.

Aspects of the disclosure relate to a computing device, apparatus, system, and/or method comprising receiving, by a first device associated with a user and from a verification computing device, a pseudorandom sequence. Based on the pseudorandom sequence, the first device may select, from a database, a plurality of parameters associated with the user. The first device may generate, based on the plurality of parameters, a token. The first device may transmit, to a second device, the token for authenticating the first device.

In some examples, after transmitting the token, the method may comprise receiving, by the first device and from the verification computing device, information indicating the first device is authenticated. Additionally or alternatively, after transmitting the token, the method may comprise receiving, from the verification computing device, information indicating the first device is authenticated. The first device may transmit, to the second device, the information indicating the first device is authenticated.

In some examples, the method may comprise synchronizing parameters associated with the user stored in the database with parameters associated with the user stored in a second database associated with the verification computing device. Additionally or alternatively, the method may comprise updating the database with one or more of the token, metadata generated during generation of the token, or transaction information between the first device and the second device.

In some examples, selecting the plurality of parameters may comprise selecting, by a proxy associated with the first device, the plurality of parameters. Generating the token may comprise generating, by the proxy associated with the first device, the token.

Other features and advantages of the disclosure will be apparent from the additional description provided herein.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings, which form a part hereof, and in which is shown by way of illustration, various embodiments of the disclosure that may be practiced. It is to be understood that other embodiments may be utilized.

As will be appreciated by one of skill in the art upon reading the following disclosure, various aspects described herein may be embodied as a method, a computer system, or a computer program product. Aspects may take the form of a computing device configured to perform specified actions. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

Figure 1:
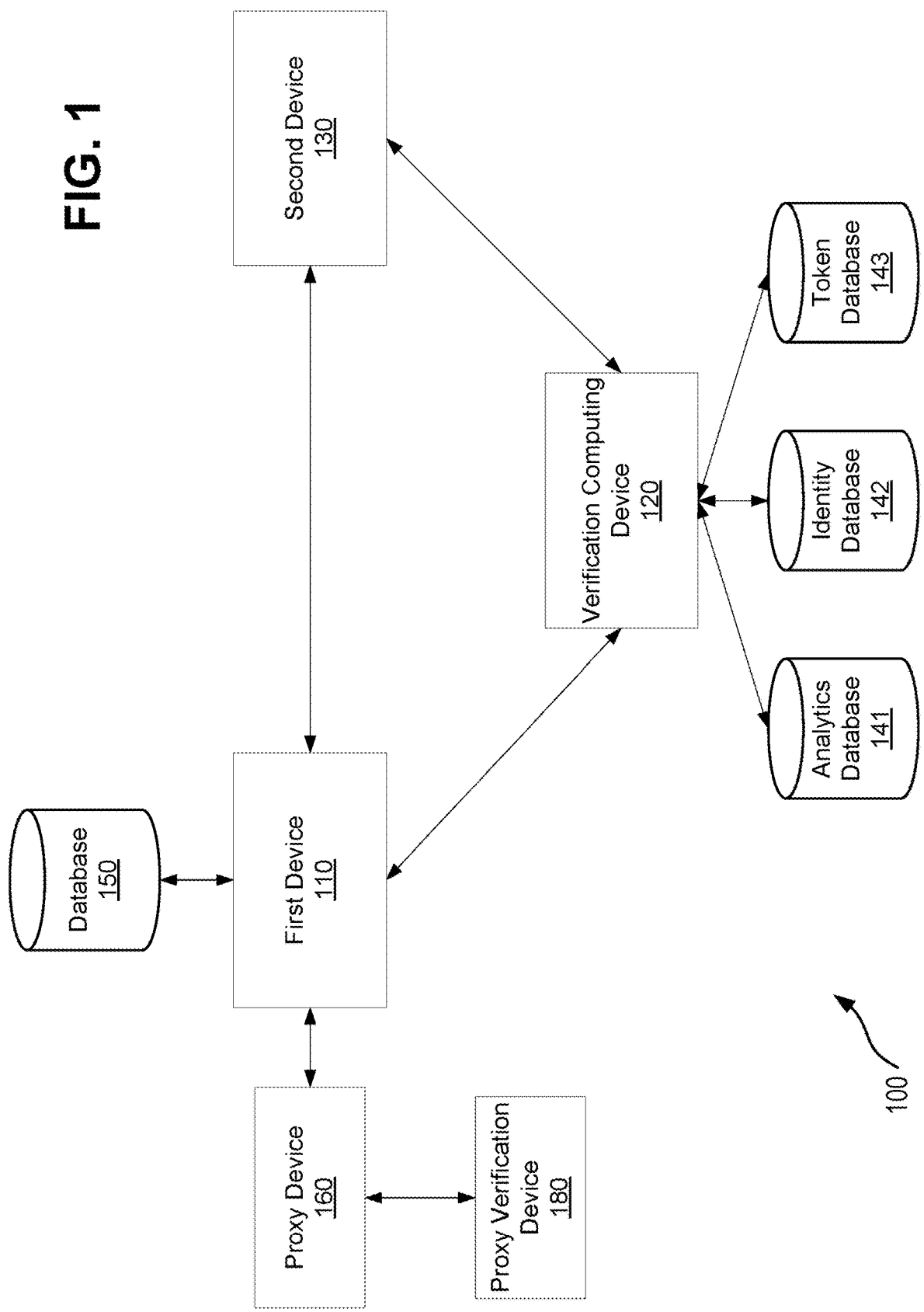
FIG. 1 is a diagram showing various example components of a system for authenticating one or more devices according to one or more aspects of the disclosure.

FIG. 1 is a diagram showing various example components of a system 100 for authenticating one or more devices according to one or more aspects of the disclosure. The system 100 may comprise a first device 110, a verification computing device 120, a second device 130, and/or other devices. Each of the first device 110, the verification computing device 120, or the second device 130 may comprise a personal computer (e.g., laptop, desktop, or tablet computer), a server (e.g., web server, database server, etc.), or a mobile communication device (e.g., mobile phone, portable computing device, etc.).

The verification computing device 120 may be used as a trusted intermediary to establish a verifiable identity for one or more of the parties in a transaction or the parties' devices. The parties to a transaction may agree to use the verification computing device 120 for authentication. The verification computing device 120 may be associated with one or more databases. For example, the system 100 may comprise an analytics database 141, an identity database 142, and/or a token database 143. Data in the databases may be stored within storage of the verification computing device 120, in separate storage, or a combination thereof. The databases may store, for each of a plurality of users or devices, a plurality of parameters associated with a user or a user device. Alternatively, there may be a single database that stores the parameters for users or their devices. The parameters may be used to authenticate the user or device, as will be described in further detail below.

The identity database 142 may store users' profile information, such as usernames, passwords, names, email addresses, user identification numbers, special dates, etc. The identity database 142 may also store history information, such as physical addresses of places lived or visited (e.g., current address, an address from three years ago, or other addresses), known contacts, possessions, actions or activities performed, or other history information. The identity database 142 may additionally or alternatively store users' biometric data, such as deoxyribonucleic acid (DNA), fingerprints, voice prints, facial structure or features, retina pattern, or other biometrics. The identity database may store behavioral characteristics of the user or user device, such as motion, gait, gestures, device usage, handwriting style, telematics data, etc. Data stored in the identity database 142 may be used to generate unique tokens, as will be described in further detail below.

The analytics database 141 may store a history of transactions performed by each user and/or user device. Transaction data may include, for example, time of the transaction, the other party or parties of the transaction, the amount of the transaction, the location of the transaction, or metadata generated before, during, or after the transaction, or other transaction data. The system may accumulate activity and behavior data (e.g., actual transaction data and metadata) for both registered users (and their devices, such as the first device 110) and enrolled third parties (e.g., the second device 130 and/or its users). Data analytics and pattern recognition techniques may be applied to the accumulated data to gain insights that can be of value to participants. For example, time series analytics for individuals may be generated; frequency analytics within user types may be generated; ranking within user types may be generated; trend analysis across and within user types may be generated.

The token database 143 may store tokens generated by the verification computing device 120 and/or tokens generated by the first device 110 and received by the verification computing device 120 from the second device 110. Tokens may be used to confirm the identity of a user and/or the user's device and may be uniquely linked to the user or user device. The token may be used to authenticate a user or a device (e.g., the first device 110) for a transaction or exchange of value. For example, a token may be generated for a first party, and a second party may use the token to verify, using the verification computing device 120, the identity of the first party. The token may comprise a globally unique identifier (GUID) that unambiguously identifies the individual or device, and two individuals might not have the same token value to prevent undetectable impersonations. A token may be generated from one user parameter or a plurality of user parameters. Tokens may be generated for a single use (e.g., a one-time token) and might not be reused, so that each token is associated with a single transaction and uniquely associates the party with the transaction.

As a user completes more transactions, more options of parameters to use for generating tokens may become available, improving the security of the system. For example, transaction data for a successful transaction (e.g., transaction time or date, amount of transaction, etc.) may be stored in the analytics database 141 and may be used to generate future tokens. As previously explained, tokens generated by the verification computing device 120 may be single use, and the same token might not be reused for another transaction (e.g., to avoid the risk of a replay attack). However, tokens generated by the verification computing device 120 for prior transactions may be stored in the token database 143 and may also be used as a parameter combined with other parameters to generate tokens in the future.

The analytics database 141, the identity database 142, and/or the token database 143 may be within the same physical storage device, or may be located in separate physical storage devices. In some examples, one or more of analytics database 141, identity database 142, or token database 143 may be located within the verification computing device 120, for example, as a part of the memory of the verification computing device 120. In some examples, one or more of the analytics database 141, the identity database 142, and the token database 143 may be remote from the verification computing device 120, for example, as one or more storage device that communicates with the verification computing device 120 via a network, such as the internet.

The system may comprise a database 150 that may store a plurality of parameters associated with user(s) of a first device 110. Some of the parameters stored in the database 150 may be the same as or similar to the parameters stored in the analytics database 141, the identity database 142, and/or the token database 143. The first device 110 may be associated with the database 150. The database 150 may be located within the first device 110. For example, the first device may comprise a mobile device, and the database 150 may be stored in the mobile device's memory. In some examples, the database 150 may be remote from the first device 110. For example, the database 150 may be located in one or more storage devices that communicate with the first device 150 via a network, such as the internet.

In some examples, the first device 110 may include an application that is synchronized to the verification computing device 120 and/or its associated databases (e.g., the analytics database 141, the identity database 142, and/or the token database 143). The verification computing device 120 and/or its associated databases may encrypt one parameter or a plurality of parameters for the user of the first device 110 (e.g., biometrics, behavioral characteristics, history, profiles, prior transaction data, prior tokens, etc.) and send the encrypted parameter(s) to the first device 110 via the application. The first device 110 may temporarily store the encrypted parameter(s) for generating tokens.

As previously described, parameters associated with the user may comprise the users' biometric data. The first device 110 may be used to collect a user's biometric data. For example, the first device 110 may have one or more sensors for receiving biometric data from the user. The first device 110 may comprise a fingerprint scanner to obtain the user's fingerprint. The first device 110 may comprise a camera with facial recognition software to obtain the user's facial features or structure. The first device 110 may comprise a DNA sample collector to obtain the user's DNA sequence. The first device 110 may comprise a microphone for collecting a voiceprint. The first device 110 may have other types of sensors for collecting users' biometric data.

As previously explained, parameters associated with the user may also comprise the user's identification information, such as a username, a password, a physical address, an email address, a user identification number, etc. The first device 110 may include an Input/Output (I/O) module having, for example, a microphone, a keypad, a touch screen, and/or a stylus through which a user may provide input of the user's identification information.

The user's biometric data, identification information, and/or other parameters may be stored in the database 150 associated with the first device 110. The parameters associated with the user may also be stored in the analytics database 141 and/or the identity database 142 associated with the verification computing device 120. As will be described in further detail below, the parameters stored in the database 150 and the parameters stored in the analytics database 141 and/or the identity database 142 may be synchronized for authentication purposes.

Parameters associated with the user may also comprise transactional history data, such as the time of a particular transaction, the other party to the transaction, the amount of the transaction, the location of the transaction, metadata generated before, during, or after a transaction, such as a transaction with another device or user (e.g., the second device 130 or a user thereof). The first device 110 may obtain transaction data after performing transactions with other devices, such as the second device 130.

As will be described in further detail below, one or more tokens may be generated to authenticate a user or the user's device for a transaction. These tokens may be stored and used to authenticate the user for future transactions. For example, a token may be combined with other parameters (e.g., transaction history, biometric data, etc.) or other tokens to generate a new token for the current transaction. By using a combination of parameters, such as transactional history, biometric data, and historical tokens as parameters, the number of parameters and the security level increases when the user and/or device participates in more transactions.

A user of the first device 110 may desire to perform a transaction with a second device 130 or a user thereof. The second device 130 or user thereof may be enrolled in a service to use the verification computing device 120 to verify the identity of the first device 110 or user thereof. In some examples, the first device 110 may generate a token based on one or more parameters associated with the user and may transmit the generated token to the second device 130. Examples of token generation will be described in further detail below. The second device 130 may receive the token and may transmit the token to the verification computing device 120 for authenticating the first device 110 or user thereof for a transaction. By generating the token at the first device 110 and the second device 130 verifying the token with the verification computing device 120, security in exchanging data may be greatly improved. For example, the token presented to the verification computing device 120 may be verified as belonging to the individual involved and has not been stolen or otherwise misappropriated by the actual participant. Accordingly, the system 100 may be secure and difficult to interfere with for malicious use, impersonation, or fraud.

In some examples, users may be verified as legitimate and enrolled prior to participation in the authentication and verification process. For example, a proxy 160 may be used for authentication. The user of the first device 110 may provide permission to the proxy 160 to use identity data in a transaction on the user's behalf (e.g., auto pay or an authorized payment agent). The proxy 160 may be, but is not limited to, a separate device from the first device 110, an application or service (e.g., an application on the first device 110), and/or another person and their device. The system may comprise a proxy verification device 180. The proxy 160 may be authenticated and validated by the proxy verification device 180 when the proxy 160 is used for a transaction. The proxy verification device 180 may be the same device as the verification computing device 120 or may be a different device. The proxy verification device 180 and/or the proxy 160 may comprise an identity verification platform (or a portion thereof) used to obtain initial identity data from new users (e.g., basic characteristics or other information associated with the new users). The initial identity data may be used to set up the new user and/or to generate an initial transaction verification token. Initial identity verification may be used to populate the user's profile with a minimum set of characteristics values, which may provide values for enough parameters for the new user to get started.

The devices illustrated in system 100 may communicate via network connections, such as a local area network (LAN), a wide area network (WAN), a wireless telecommunications network, and/or other networks. When used in a LAN networking environment, the first device 110, the verification computing device 120 or the second device 130 may be connected to the LAN through a network interface or adapter. When used in a WAN networking environment, each of the devices may include a modem or other means for establishing communications over the WAN, such as a network (e.g., the Internet). When used in a wireless telecommunications network, the first device 110, the verification computing device 120, or the second device 130 may include one or more transceivers, digital signal processors, and additional circuitry and software for communicating with wireless computing devices (e.g., mobile phones, vehicles, etc.) via one or more network devices (e.g., base transceiver stations) in the wireless network. It will be appreciated that the network connections shown and described are illustrative and other means of establishing a communications link between the devices may be used. The existence of any of various network protocols such as TCP/IP, Ethernet, FTP, HTTP and the like, and of various wireless communication technologies such as GSM, CDMA, LTE, Wi-Fi, and WiMAX, is presumed, and the various computing devices and system components described herein may be configured to communicate using any of these network protocols or technologies.

Figure 2:
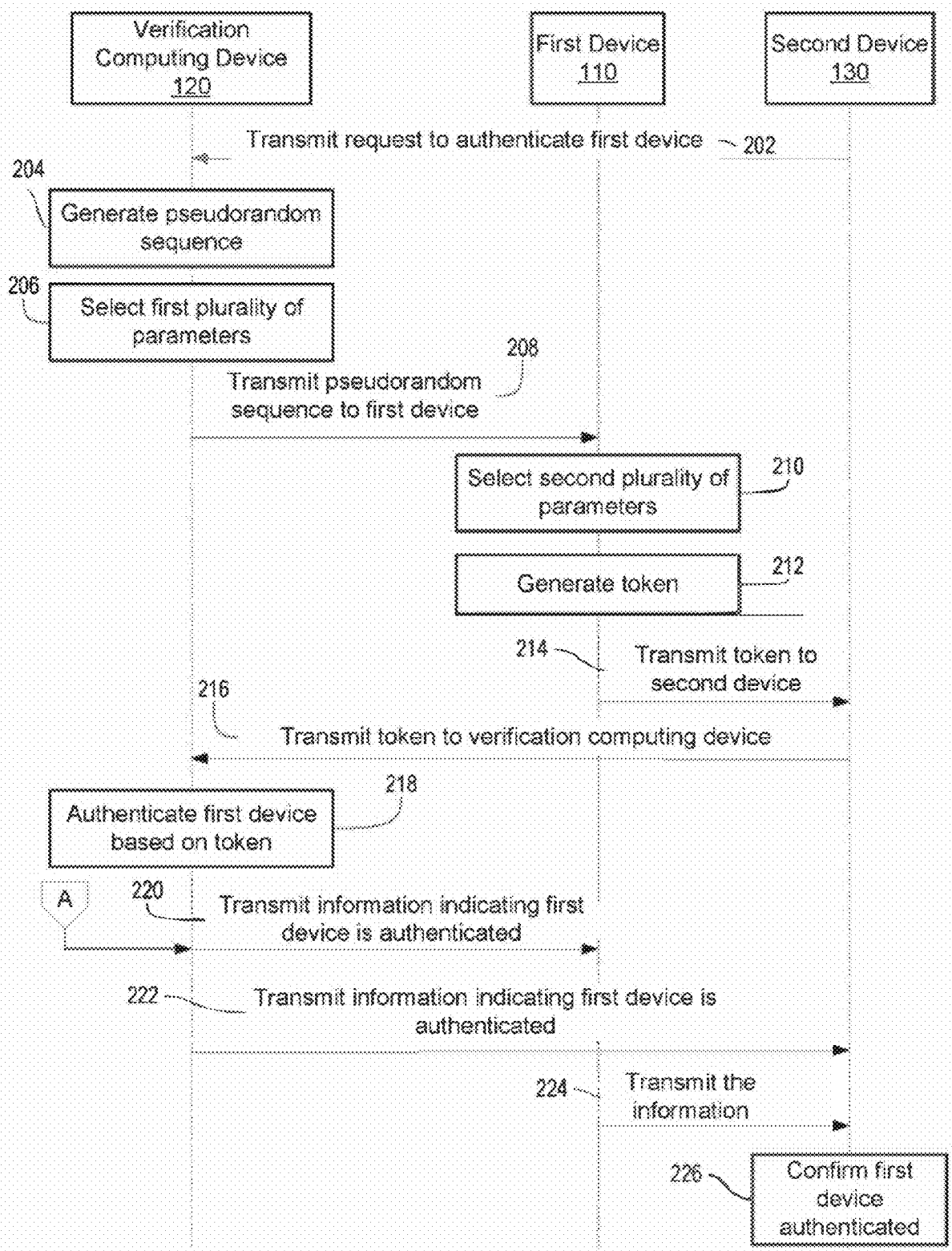
FIG. 2 is a flow diagram illustrating an example method for authenticating a device according to one or more aspects of the disclosure.

FIG. 2 is a flow diagram illustrating an example method for authenticating a device according to one or more aspects of the disclosure. The steps illustrated in FIG. 2 may be performed by one or more of the devices illustrated in FIG. 1, such as the first device 110, the verification computing device 120, and/or the second device 130.

In step 202, the second device 130 may transmit a request to authenticate the first device 110. For example, the second device 130 may perform step 202 when the second device 130 is used to perform a transaction with the first device 110, but the second device 130 desires to authenticate the first device 110 to, for example, prevent fraudulent activity. In some scenarios, the user of the second device 130 may be shopping on an online shopping portal and may want to make a payment to the user of the first device 110. However, the user of the second device 130 might be uncertain whether the first device 110 is authenticated by a merchant associated with the online shopping platform to receive the payment. In another example, the user of the second device 130 may receive payment information (e.g., credit card information) from the first device 110, but the second device 130 may be uncertain about whether the user of the first device 110 is authorized by the credit card company to use the credit card.

The request from the second device 130 may indicate the first device 110 as the target device to be authenticated. Multiple users could use the first device 110. In these examples, the request may indicate which user of the first device 110 is involved in the current transaction with the second device 130. In some examples, the first device 110 may transmit, to the verification computing device 120, the request to authenticate the first device 110 for the transaction with the second device 130 (e.g., in step 202). The first device 110 may send the request each time the first device 110 attempts a certain type of transaction. Additionally or alternatively, the first device 110 may send the request after the first device 110 receives a request from the second device 130 to verify the identity of the first device 110.

The verification computing device 120 may receive the request from the second device 130 (or the first device 110). After the verification computing device 120 receives the request, the verification computing device 120 may verify the identity of the device sending the request, such as the second device 130 if the second device 130 sent the request. For example, the verification computing device 120 may send a message to the first device 110 to confirm that the first device 110 is attempting to complete a transaction with the second device 130. In other examples, the verification computing device 120 might not send a request to the first device 110 to confirm the transaction. For example, the verification computing device 120 may proceed to step 204, and the first device 110 may later decide whether to generate a token to authenticate itself.

In some examples, the verification computing device 120 might determine that the databases do not have parameters for the user or that the number of parameters for the user is less than a threshold number of parameters. The verification computing device 120 may attempt to obtain parameters associated with the user. For example, the verification computing device 120 may request the user of the first device 110 to provide one or more parameters, such as one or more user identifiers, one or more addresses, one or more fingerprints, or other parameters. The verification computing device 120 may also access one or more databases, such as the database 150, to retrieve parameters associated with the user. The parameters between databases may be synchronized, as will be described in further detail below with reference to FIG. 5.

In step 204, the verification computing device 120 may generate a pseudorandom number or sequence. The verification computing device 120 may use any type of algorithm to generate the pseudorandom number or sequence, such as a pseudorandom number generator. For example, the pseudorandom number or sequence may comprise a pseudorandom sequence of binary numbers, such as 001011. As another example, the pseudorandom number or sequence may comprise a pseudorandom sequence of decimal numbers, such as 931478928. As yet another example, the pseudorandom number or sequence may comprise a sequence of letters, such as kcoielcpq. The pseudorandom number or sequence may comprise a combination of binary numbers, decimal numbers, letters, and/or other characters. The pseudorandom number or sequence may comprise a sequence of indexes, and each index may point to a physical or logical address within the database(s) associated with the verification computing device 120 (e.g., the databases 141, 142, and/or 143).

In step 206, the verification computing device 120 may select a first plurality of parameters associated with the user, and the selection may be based on the generated pseudorandom sequence. The parameters may be retrieved from one or more of the analytics database 141, the identity database 142, or the token database 143. As previously explained, the database(s) may store parameters for multiple users, and the user of the first device 110 may be identified in the received request (e.g., in step 202).

Selection of the first plurality of parameters may be based on the pseudorandom sequence generated by the verification computing device 120 (e.g., in step 204). For example, assume that there are six parameters associated with a user of the first device 110, and the six parameters are in an ordered sequence. The verification computing device 120 may generate, in step 204, a pseudorandom sequence used to determine whether to use each of the six parameters. For example, assume that the generated pseudorandom sequence is a sequence of binary numbers, such as 001011. Based on the sequence 001011, the verification computing device 120 may select the third, fifth, and sixth parameters associated with the user. Alternatively, the verification computing device 120 may select the first, second, and fourth parameters associated with the user.

As another example, the verification computing device 120 may use a table, such as a hash table, to select parameters. Assume, for example, that the pseudorandom sequence comprises a sequence of decimal numbers 931478928. The verification computing device 120 may use a hash table or function to map the first number (9) to a database, such as identity database 142. The verification computing device 120 may use a hash table or function to map the second and third numbers (31) to a particular parameter associated with the user and stored within the identity database 142, such a retina pattern. The verification computing device 120 may use a hash table or function to map the fourth number (4) to a database, such as analytics database 141. The verification computing device 120 may use a hash table or function to map the fifth and sixth numbers (78) to a particular parameter associated with the user and stored within the analytics database 141, such the amount of a transaction performed by the user Aug. 1, 2016. The verification computing device 120 may use a hash table or function to map the seventh number (9) to a database, such as the identity database 142. The verification computing device 120 may use a hash table or function to map the eighth and ninth numbers (28) to a particular parameter associated with the user and stored within the identity database 142, such a fingerprint of an index finger.

As previously explained, the pseudorandom sequence may comprise a sequence of letters, and the verification computing device 120 may use a similar approach as the decimal numbers to select parameters (e.g., using hash functions or tables). Additionally or alternatively, the pseudorandom sequence may comprise a sequence of indexes or other pointers to storage locations of the parameters, and the verification computing device 120 may use each index in the sequence of indexes to select the parameters.

In step 208, the verification computing device 120 may transmit, to the first device 110, data indicating the generated pseudorandom sequence. If multiple users are associated with the first device 110, the verification computing device 120 may also transmit an indication of the user's identifier to the first device 110. The first device 110 may receive the pseudorandom sequence and/or the user's identifier from the verification computing device 120. The first device 110 may confirm the user's desire to authenticate with the second device 130 for performing a transaction with the first device 110.

In step 210, the first device 110 may use the received pseudorandom sequence to select, from the database 150, a second plurality of parameters corresponding to the first plurality of parameters selected by the verification computing device 120. For example, the parameters in the database 150 may be ordered in the same order as the parameters in the database(s) associated with the verification computing device 120. The first device 110 may use the pseudorandom sequence to select the parameters in the database 150 corresponding to the parameters selected by the verification computing device 120.

A mapping between the first plurality of parameters and the second plurality of parameters may be used by the first device 110 to select the appropriate parameters for generating a token. For example, the pseudorandom sequence may comprise a sequence of indexes or other pointers, each of which points to a storage location (e.g., address) in the analytics database 141, the identity database 142, and/or the token database 143. The first device 110 may have a mapping table (e.g., an address mapping table) that may be used to identify the storage locations of the corresponding parameters in the database 150. The first device 110 may use the pseudorandom sequence with the mapping table to identify the storage locations of the second plurality of parameters corresponding to the first plurality of parameters selected by the verification computing device 120.

In step 212, the first device 110 may generate a token based on the second plurality of parameters selected by the first device 110 (e.g., in step 210). In some examples, the first device 110 may hash the second plurality of parameters, resulting in a single token. An algorithm may be provided for each type of input value, such as a string of characters, a name, a number, a date, a transaction ID, a token derived from a pattern, a biometric (e.g., a fingerprint or retinal scan), or any other type of input that could be selected. There may be one mapping algorithm for each input data type. The algorithm for each type of input may map the input value to an intermediate representation space, which may comprise a value (e.g., a numeric value) of fixed length (e.g., a hash). The set of hashed values may then be processed by a second algorithm to produce a token (e.g., a GUID) that may be used for transaction verification. For example, there may be one mapping algorithm for each set (e.g., from one to n inputs) of mapped values to generate the final token. This mapping may take the number of inputs as a parameter to determine how to generate the final value. By choosing the plurality of parameters based on a random or pseudorandom number or sequence, it might be more difficult for fraudulent actors that might have access to some or all of the parameters to re-generate the token.

In step 214, the first device 110 may transmit the token to the second device 130, such as to the second device's network address. The first device 110 may determine the second device 130's network address (e.g., IP address or other address) using various techniques. For example, the first device 110 may have received the second device 130's network address from the verification computing device 120 (e.g., in step 208). As another example, the first device 110 may receive the second device 130's network address from the second device 130 itself. For example, before or after the second device 130 transmits the request to authenticate the first device 110 (e.g., in step 202), the second device 130 may also transmit, to the first device 110, an indication that the second device 130 will attempt to authenticate the first device using the verification computing device 120. The second device 130 may receive the token from the first device 110.

In step 216, after the second device 130 receives the token, the second device 130 may transmit the token to the verification computing device 120 for authenticating the first device 110. The verification computing device 120 may receive the token.

In some scenarios, the verification computing device 120 might not receive the token from the second device 130 within a predetermined amount of time. The verification computing device 120 may use a threshold time for security purposes. If the threshold time has been exceeded, the verification computing device 120 may time out and determine that the first device 110 is not authenticated. For example, the method may proceed to step 308 or 418 shown in FIG. 3 and FIG. 4, respectively, and as will be described in further detail below.

Returning to FIG. 2, in step 218, the verification computing device 120 may attempt to authenticate the first device 110 based on the token received from the second device 130. Examples of the verification computing device 120 authenticating the first device 110 based on the token are illustrated in FIG. 3 and FIG. 4.

Figure 3:
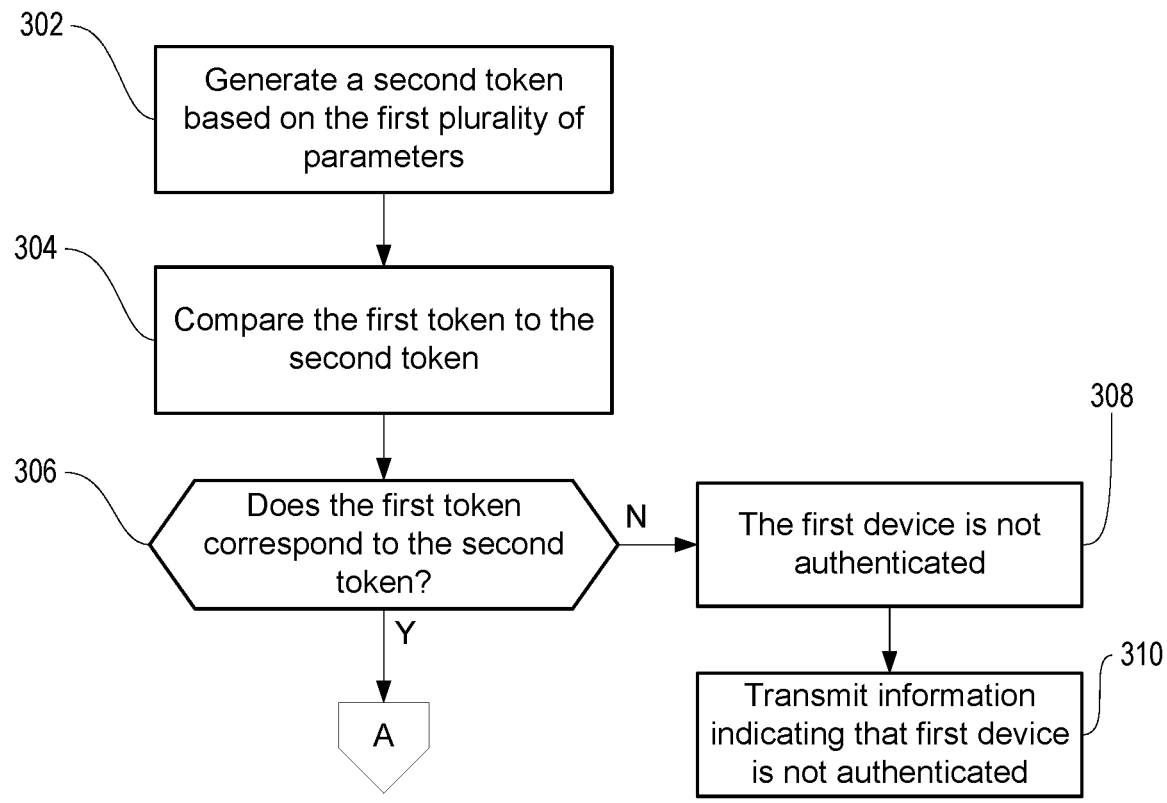
FIG. 3 is a flow diagram illustrating an example of authenticating a device based on a received token according to one or more aspects of the disclosure.

FIG. 3 is a flow diagram illustrating an example of authenticating a device based on a received token according to one or more aspects of the disclosure. For example, the verification computing device 120 may attempt to verify a token received from the second device 130 by generating its own token. In step 302, the verification computing device 120 may generate a second token based on the first plurality of parameters the verification computing device selected based on the pseudorandom sequence (e.g., in step 206). With brief reference to FIG. 2, the verification computing device 120 may generate the second token before or after it transmits the pseudorandom sequence to the first device (e.g., in step 208). The algorithm(s) used by the verification computing device 120 to generate the second token may be the same or a similar algorithm used by the first device 110 to generate the first token (e.g., in step 212), as previously described.

Returning to FIG. 3, in step 304, the verification computing device 120 may compare the first token to the second token. In step 306, the verification computing device 120 may determine whether the first token corresponds to the second token. If the first token corresponds to the second token (step 306: Y), the verification computing device 120 may determine that the first device 110 is authenticated for the transaction. The method may proceed to step 220 shown in FIG. 2, as will be described in further detail below. If the first token does not correspond to the second token (step 306: N), the verification computing device 120 may determine, in step 308, that the first device is not authenticated. In step 310, the verification computing device 120 may transmit, to the first device 110 and/or the second device 130, information indicating that the first device 110 is not authenticated. The second device 130 may use the indication to deny the transaction or to attempt to authenticate the first device 110 again, such as by using different parameters or a different token.

Figure 4:
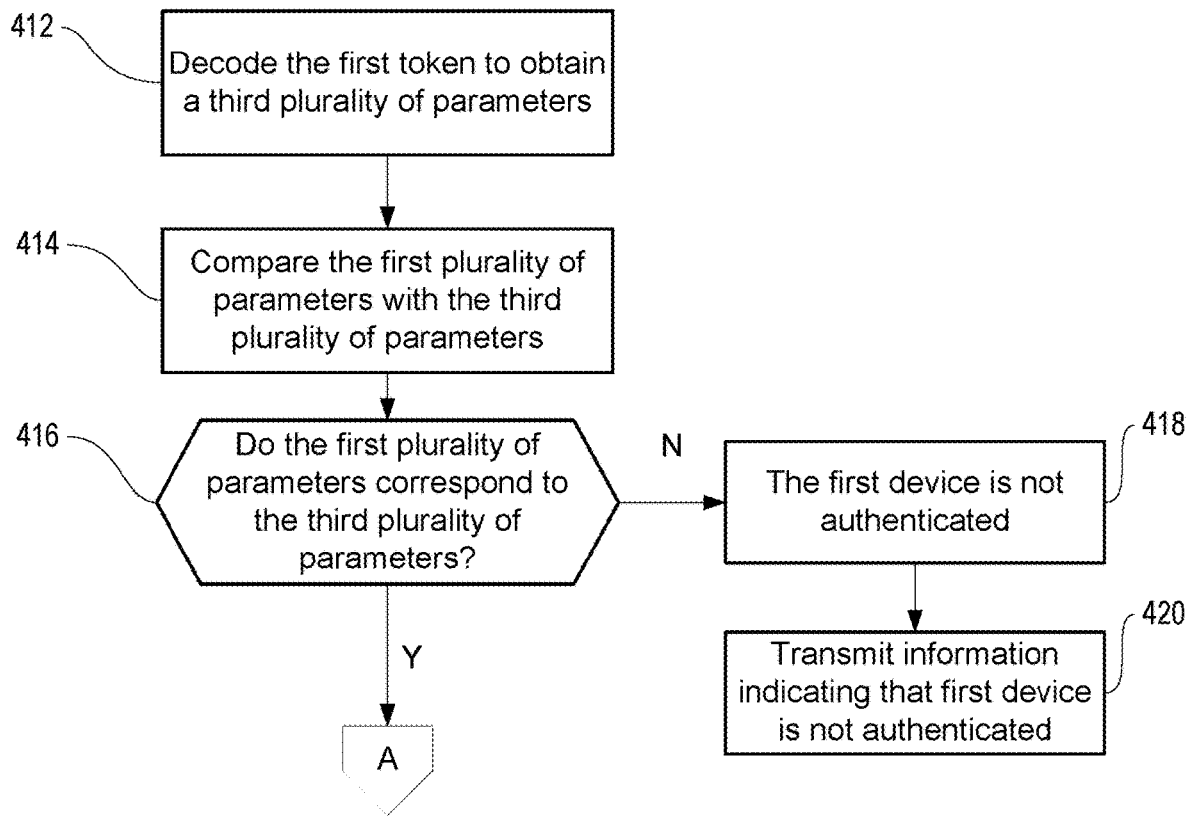
FIG. 4 is a flow diagram illustrating another example of authenticating a device based on a received token according to one or more aspects of the disclosure.

FIG. 4 is a flow diagram illustrating another example of authenticating a device based on a received token according to one or more aspects of the disclosure. For example, the verification computing device 120 may attempt to verify a token received by the second device 130 by decoding the token to identify the parameters that were used to generate the token. In step 412, the verification computing device 120 may decode the token or otherwise re-generate the parameters used to generate the token. For example, the verification computing device 120 may obtain the algorithm(s) used by the first device 110 to generate the token (e.g., in step 212) and may use the algorithm to decode the token. After decoding the token, the verification computing device 120 may obtain a third plurality of parameters from the token.

In step 414, the verification computing device 120 may compare the first plurality of parameters selected by the verification computing device 120 to the third plurality of parameters obtained from decoding the token received from the second device 130. In step 416, the verification computing device 120 may determine whether the first plurality of parameters correspond to the third plurality of parameters. If the first plurality of parameters does not correspond to the third plurality of parameters (step 416: N), the verification computing device 120 may determine, in step 418, that the first device is not authenticated. In step 420, the verification computing device 120 may transmit, to the first device 110 and/or the second device 130, information indicating that the first device 110 is not authenticated. The second device 130 may use the indication to deny the transaction or to attempt to authenticate the first device 110 again, such as by using different parameters or a different token. If, on the other hand, the first plurality of parameters corresponds to the third plurality of parameters (step 416: Y), the verification computing device 120 may determine that the first device 110 is authenticated for the transaction. The method may proceed to step 220.

Returning to FIG. 2, in step 220, the verification computing device 120 may transmit, to the first device 110, information indicating that the first device is authenticated. In step 222, the verification computing device 120 may also transmit, to the second device 130, information indicating the first device is authenticated. The information transmitted to the first device 110 may correspond (e.g., match) the information transmitted to the second device 130. For example, the verification computing device 120 may transmit a confirmation code, such as 1234, to the first device 110 and/or the second device 130. As another example, the verification computing device 120 may transmit a confirmation message to the first device 110 and/or the second device 130, such as an indication that the first device has been authenticated or the user has been authenticated.

In some scenarios, the user of the first device 110 may be physically present at the location of the second device 130 and/or a user of the second device 130 (e.g., a merchant). The verification computing device 120 may transmit a confirmation code or message to the first device 110, and the first device 110 may display the confirmation message or number on a display device of the first device 110. The user of the first device 110 may show the user of the second device 130 the displayed message. The user of the second device 130 may confirm the identity based on the displayed message (e.g., in step 226). For example, a match between the confirmation number or message of the first device 110 and the second device 130 within a predetermined time period may be used to authenticate the first device 110.

In some scenarios, the first device 110 may forward, to the second device 130, the information received from the verification computing device 120, such as in step 224. For example, the verification computing device 120 may have instructed the first device 110 to transmit the confirmation to the second device 130, or the first device 110 may have pre-stored instructions to transmit the confirmation information to the second device 130 after the first device 110 receives the confirmation information from the verification computing device 120. In step 226, the second device 130 may confirm that the first device 110 has been authenticated and may proceed with the transaction with the user of the first device 110.

Figure 5:
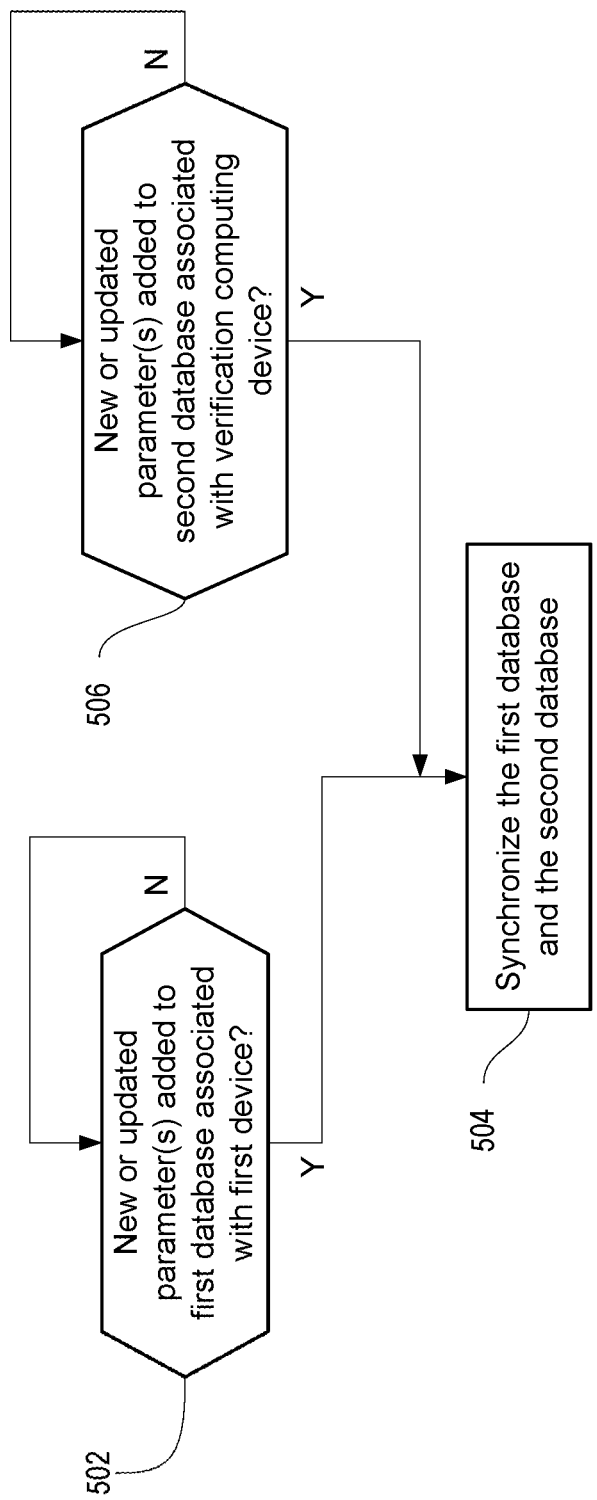
FIG. 5 is a flow diagram illustrating an example method for obtaining parameters associated with a user and synchronizing parameters between databases according to one or more aspects of the disclosure.

FIG. 5 is a flow diagram illustrating an example method for obtaining parameters associated with a user and synchronizing parameters between databases according to one or more aspects of the disclosure. For example, parameters associated with the user may be synchronized between one or more databases associated with the first device 110 shown in FIG. 1, and one or more databases associated with the verification computing device 120.

In step 502, the first device 110 may obtain one or more parameters associated with a user of the first device 110. The first device 110 may add the new or updated parameters to the database 150 associated with the first device 110. As previously explained, parameters associated with a user may comprise the user's biometrics data, such as fingerprint, facial features or structure, DNA, voiceprint, etc. In some examples, sensors of the first device 110 may be used to collect the user's biometric data (e.g., a fingerprint scanner to capture an image of the fingerprint, a camera to capture an image of the user's face, etc.). Parameters associated with the user may also comprise the user's identification information, such as a username, password, address, etc. These parameters may be updated or added over time, such as if the user's facial features change, their voice changes, they change their username, password, or location, etc., and the database 150 may be modified with the updated or newly added parameters.

In step 504, the first database 150 associated with the first device 110 may be synchronized with a second database associated with the verification computing device 120. As previously explained, the second database may comprise one or more of the analytics database 141, the identity database 142, and/or the token database 143. The first device 110 may synchronize new or updated parameters in the first database 150 by transmitting the new or updated parameters to the second database and/or the verification computing device 120 for updating the second database. In some examples, one or more parameters transmitted to the second database or verification computing device 120 may be one or more raw parameters stored in the first database 150. In other examples, the parameters transmitted to the second database or verification computing device 120 may be a modified version of the parameters stored in the first database 150. For example, the parameter stored in the first database 150 may be compressed or otherwise reduced in size, and the resulting modified parameter may be sent for storage in the second database. As another example, the parameter stored in the first database 150 may be encrypted and/or signed before being sent for storage in the second database.

Synchronizing the first database and second database may be based on the location within each database that each parameter is stored. For example, the location may be identified by a logical address, and the logical address of the new or updated parameters in the first database may be transmitted to the second database or the verification computing device 120. The new or updated parameters may be stored at a corresponding logical address in the second database. The logical address may be used to select parameters for generating a token. For example, the verification computing device 120 may select a plurality of parameters based on a pseudorandom sequence (e.g., in step 206). The verification computing device 120 may identify the logical address or addresses of the selected parameters and transmit, to the first device 110, an indication of the logical address or addresses (e.g., in step 208). The first device 110 may select a plurality of parameters (e.g., in step 210) based on the logical address or addresses received from the verification computing device 120.

One or more databases associated with the verification computing device 120, such as the analytics database 141, the identity database 142, and/or the token database 143, may similarly be updated with new parameters. The first database 150 may be synchronized with the database(s) associated with the verification computing device 120 so that the parameters between the two databases are both updated. With reference to FIG. 5, in step 506, the verification computing device 120 may receive updated parameters associated with the user. For example, parameters such as transaction data, biometrics, and/or tokens generated for prior transactions may be obtained by the verification computing device 120. The new or updated parameters may be obtained from the first device 110, another device associated with the user, or another data source. In step 504, the first database 150 may be synchronized with the database(s) associated with the verification computing device 120, as previously explained. For example, the verification computing device 120 or its database(s) may send, to the first device 110 and/or the first database 150, the modified parameter(s), the storage location of the modified parameter(s), and the like. Parameter(s) in the first database 150 may be synchronized with the updated parameter(s) in the database(s) associated with the verification computing device 120.

In some examples, step 504 may be performed whenever a new or updated parameter is added to the first database or a new or updated parameter is added to the second database. In other examples, step 504 may be performed at certain time intervals. For example, updates to parameters in either the first database or the second database may be checked at regular intervals, and the databases may be synchronized if there has been an update in one or both of the databases. Step 504 may also or alternatively be performed at the beginning or at the end of each authentication request or process. In some examples, if a new or updated parameter has been added to a database in step 502 or 506, but has not been synchronized with the other database, the new or updated parameter may be temporarily marked as not to be used for generating tokens. The mark may be removed after the databases have been synchronized.

In some examples, databases may be synchronized using other devices, such as another device associated with the user. For example, assume that the first device 110 obtains a new parameter, such as a fingerprint. The verification computing device 120 may receive the fingerprint or other parameter from another source, such as another device associated with the user. For example, the user may use both the first device 110 and another device, and the first device 110 may obtain the user's fingerprint via its own fingerprint scanner. The user may also provide his or her fingerprint to a sensor of the other device, the other device may send the captured fingerprint to the verification computing device 120. The verification computing device 120 may store, in one or more of its databases, the fingerprint from the other device. The fingerprint stored in the database 150 associated with the first device 110 may have slight variations from the fingerprint stored in the database associated with the verification computing device 120. Other devices may similarly be used to synchronize other parameters, such as voiceprints, facial features, user identity information, etc.

Figure 6:
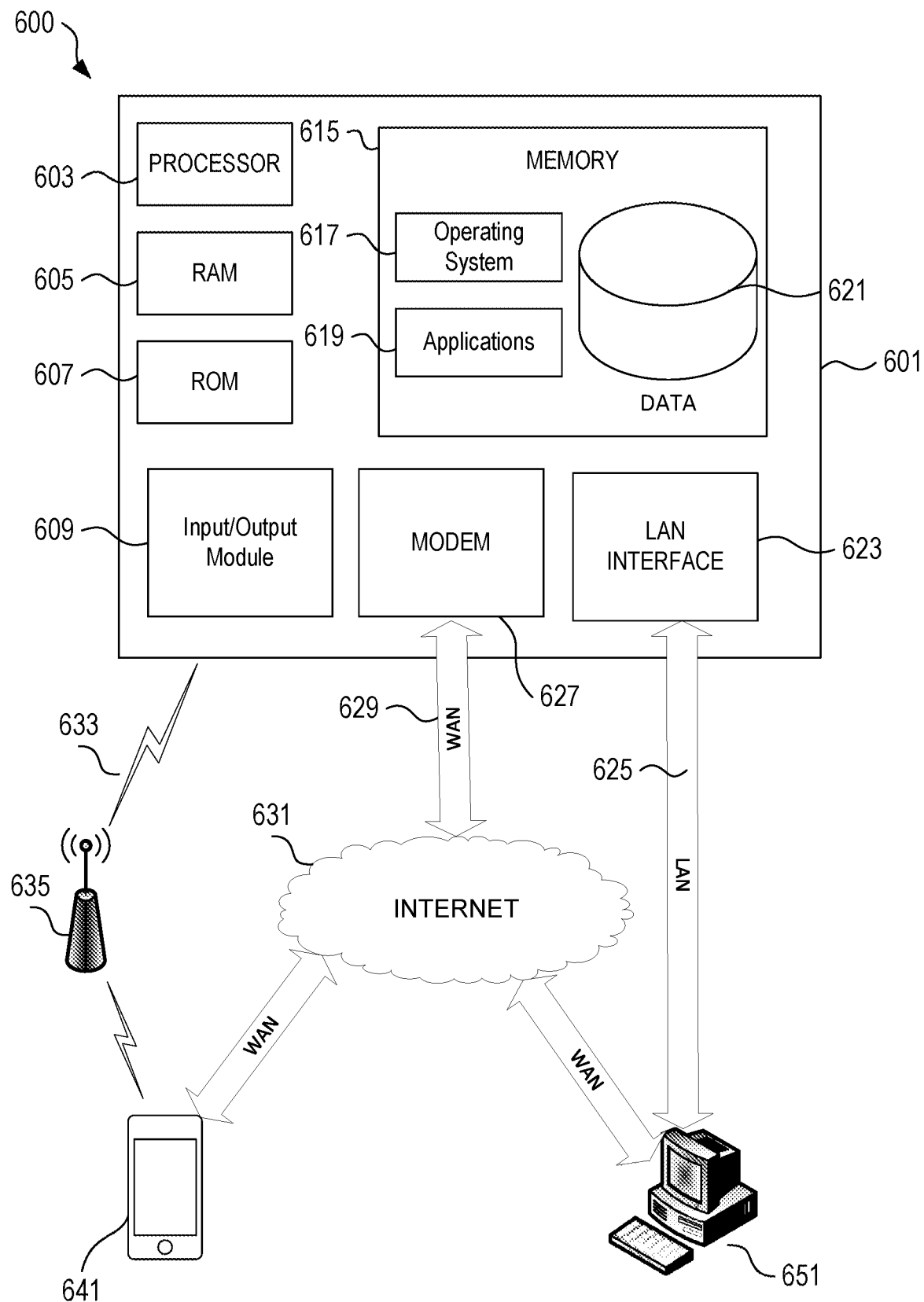
FIG. 6 illustrates a network environment and computing systems that may be used to implement aspects of the disclosure.

FIG. 6 illustrates a block diagram of a computing device 601 and other devices in a computing system 600 that may be used according to one or more illustrative aspects of the disclosure. The computing device 601 may be, for example, the verification computing device 120 in the system 100. The computing device 601 may have a processor 603 for controlling overall operation of the computing device 601 and its associated components, including RAM 605, ROM 607, input/output module 609, and memory unit 615. The computing device 601, along with one or more additional devices (e.g., terminals 641, 651) may correspond to any of multiple systems or devices, such as computing devices or systems, configured as described herein for authenticating devices via tokens and/or verification computing devices.

Input/Output (I/O) module 609 may include a microphone, keypad, touch screen, and/or stylus through which a user of the computing device 601 may provide input, and may also include one or more of a speaker for providing audio input/output and a video display device for providing textual, audiovisual and/or graphical output. Software may be stored within memory unit 615 and/or other storage to provide instructions to processor 603 for enabling device 601 to perform various functions. For example, memory unit 615 may store software used by the device 601, such as an operating system 617, application programs 619, and an associated internal database 621. If the computing device 601 corresponds to the verification computing device 120, the database 621 may correspond to one or more of the analytics database 141, identity database 142, or token database 143.

The memory unit 615 includes one or more of volatile and/or non-volatile computer memory to store computer-executable instructions, data, and/or other information. Processor 603 and its associated components may allow the computing device 601 to execute a series of computer-readable instructions to execute a series of computer-readable instructions to perform one or more of the steps shown in FIG. 2, FIG. 3, FIG. 4, or FIG. 5. Additionally or alternatively, application program 619 used by the computing device 601 may include computer executable instructions (e.g., cryptographic algorithms, etc.) to perform one or more of the steps shown in FIG. 2, FIG. 3, FIG. 4, or FIG. 5.

The computing device 601 may operate in a networked environment 600 supporting connections to one or more remote computers, such as terminals/devices 641 and 651. The computing device 601, and related terminals/devices 641 and 651, may include devices installed in ground, air, or space vehicles or mobile devices that are configured to receive and process image and external data. Thus, the computing device 601 and terminals/devices 641 and 651 may each include personal computers (e.g., laptop, desktop, or tablet computers), servers (e.g., web servers, database servers), vehicle-based devices (e.g., on-board vehicle computers, short-range vehicle communication systems, sensors and telematics devices), or mobile communication devices (e.g., mobile phones, portable computing devices, and the like), and may include some or all of the elements described above with respect to the computing device 601. For example, the device 641 may correspond to the first device 110 in the system 100, and/or the device 651 may correspond to the second device 130 in the system 100.

The network connections depicted in FIG. 6 include a local area network (LAN) 625 and a wide area network (WAN) 629, and a wireless telecommunications network 633, but may also include other networks. When used in a LAN networking environment, the computing device 601 may be connected to the LAN 625 through a network interface or adapter 623. When used in a WAN networking environment, the device 601 may include a modem 627 or other means for establishing communications over the WAN 629, such as network 631 (e.g., the Internet). When used in a wireless telecommunications network 633, the device 601 may include one or more transceivers, digital signal processors, and additional circuitry and software for communicating with wireless computing devices 641 (e.g., mobile phones, short-range vehicle communication systems, vehicle sensing and telematics devices) via one or more network devices 635 (e.g., base transceiver stations) in the wireless network 633.

It will be appreciated that the network connections shown are illustrative and other means of establishing a communications link between the computers may be used. The existence of any of various network protocols such as TCP/IP, Ethernet, FTP, HTTP and the like, and of various wireless communication technologies such as GSM, CDMA, Wi-Fi, and WiMAX, is presumed, and the various computing devices and computing device components described herein may be configured to communicate using any of these network protocols or technologies.

While the aspects described herein have been discussed with respect to specific examples including various modes of carrying out aspects of the disclosure, those skilled in the art will appreciate that there are numerous variations and permutations of the above described systems and techniques that fall within the spirit and scope of the invention.

What is claimed is:

1. A method comprising:
   receiving, at a second device, a request from a first device to execute a payment transaction with the second device, the request including an identifier associated with the second device;
   responsive to receiving the request to execute the payment transaction at the second device, transmitting, from the second device, a request to a verification system to authenticate the second device;
   receiving, at the second device, a response to the request to authenticate, from the verification system, the response indicating a randomized sequence of database entries for use in token generation by the second device;
   accessing a first database associated with the second device to extract a first plurality of data elements indicated by the randomized sequence;
   generating a first token based on the first plurality of data elements;
   transmitting the first token to the first device;
   sending the first token from the first device to the verification system for validation;
   receiving a response at the first device indicating whether the verification system validated the first token; and
   responsive to the response received at the first device indicating that the verification system validated the first token, approving, at the first device, the second device for execution of the payment transaction.

2. The method of claim 1, wherein the request to execute payment further includes a user identifier of a user associated with the second device.

3. The method of claim 2, wherein the request to authenticate includes the user identifier.

4. The method of claim 1, wherein at least one of the first and second devices includes a mobile device.

5. The method of claim 1, wherein the randomized sequence comprises a sequence of a plurality of indexes, each index of the plurality pointing to at least one of a physical or logical address within the first database.

6. The method of claim 1, further comprising:
   accessing, at the verification system and responsive to the request to authenticate received from the second device, a second database associated with the verification system, to extract a second plurality of data elements indicated by the randomized sequence;

generating, at the verification system, a second token from the second plurality of data elements;

comparing the second token to the first token, wherein a correspondence between the second token and the first token constitutes validation of the first token; and transmitting, from the verification system to the first device, the results of the comparing indicating whether the verification system validated the first token.

7. The method of claim 1, further comprising:

accessing, at the verification system and responsive to the request to authenticate received from the second device, a second database associated with the verification system, to extract a second plurality of data elements indicated by the randomized sequence;

decoding, at the verification system, the first token to obtain the first plurality of data elements;

comparing the first plurality of data elements to the second plurality of data elements, wherein a correspondence between the first plurality of data elements and the second plurality of data elements constitutes validation of the first token; and transmitting, from the verification system to the first device, the results of the comparing indicating whether the verification system validated the first token.

8. A method comprising:

receiving, at a second device, a request from a first device to validate the second device;

responsive to receiving the request to validate at the second device, transmitting, from the second device, a request to a verification system to authenticate the second device;

receiving, at the second device, a response to the request to authenticate, from the verification system, the response indicating a randomized sequence of database entries for use in token generation by the second device;

accessing a first database associated with the second device to extract a first plurality of data elements indicated by the randomized sequence;

generating a first token based on the first plurality of data elements;

transmitting the first token to the first device;

sending the first token from the first device to the verification system for validation;

receiving a response at the first device indicating whether the verification system validated the first token; and responsive to the response received at the first device indicating that the verification system validated the first token, approving, at the first device, the second device for execution of a payment transaction.

9. The method of claim 8, wherein the request to execute payment further includes a user identifier of a user associated with the second device.

10. The method of claim 9, wherein the request to authenticate includes the user identifier.

11. The method of claim 8, wherein at least one of the first and second devices includes a mobile device.

12. The method of claim 8, wherein the randomized sequence comprises a sequence of a plurality of indexes, each index of the plurality pointing to at least one of a physical or logical address within the first database.

13. The method of claim 8, further comprising:

accessing, at the verification system and responsive to the request to authenticate received from the second device, a second database associated with the verification system, to extract a second plurality of data elements indicated by the randomized sequence;

generating, at the verification system, a second token from the second plurality of data elements;

comparing the second token to the first token, wherein a correspondence between the second token and the first token constitutes validation of the first token; and transmitting, from the verification system to the first device, the results of the comparing indicating whether the verification system validated the first token.

14. The method of claim 8, further comprising;

accessing, at the verification system and responsive to the request to authenticate received from the second device, a second database associated with the verification system, to extract a second plurality of data elements indicated by the randomized sequence;

decoding, at the verification system, the first token to obtain the first plurality of data elements;

comparing the first plurality of data elements to the second plurality of data elements, wherein a correspondence between the first plurality of data elements and the second plurality of data elements constitutes validation of the first token; and transmitting, from the verification system to the first device, the results of the comparing indicating whether the verification system validated the first token.

15. A system comprising:

a first computing device including at least a first processor;

a second computing device including at least a second processor; and a verification computing device including a least a third processor, wherein the second processor is configured to:
  receive a request from the first computing device to validate the second computing device,
  responsive to receiving the request to validate, transmit a request to the verification computing device to authenticate the second computing device;
  receive a response to the request to authenticate, from the verification computing device, the response indicating a randomized sequence of database entries for use in token generation by the second processor;
  access a first database associated with the second computing device to extract a first plurality of data elements indicated by the randomized sequence;
  generate a first token based on the first plurality of data elements;
  transmit the first token to the first computing device;

wherein the first processor is configured to:
  send the first token to the verification computing device for validation;
  receive a response indicating whether the verification computing device validated the first token; and
  responsive to the response received at the first computing device indicating that the verification computing device validated the first token, approve the second computing device for execution of a payment transaction.

16. The system of claim 15, wherein the request to execute payment further includes a user identifier of a user associated with the second computing and wherein the request to authenticate includes the user identifier.

17. The system of claim 15, wherein at least one of the first computing device and the second computing device includes a mobile device.

18. The system of claim 15, wherein the randomized sequence comprises a sequence of a plurality of indexes, each index of the plurality pointing to at least one of a physical or logical address within the first database.

19. The system of claim 15, wherein the third processor is further configured to:
- access, responsive to the request to authenticate received from the second computing device, a second database associated with the verification computing device, to extract a second plurality of data elements indicated by the randomized sequence;
- generate a second token from the second plurality of data elements;
- compare the second token to the first token, wherein a correspondence between the second token and the first token constitutes validation of the first token; and
- transmit, to the first computing device, the results of the comparison indicating whether the verification computing device validated the first token.

20. The system of claim 15, wherein the third processor is further configured to:
- access, responsive to the request to authenticate received from the second computing device, a second database associated with the verification computing device, to extract a second plurality of data elements indicated by the randomized sequence;
- decode the first token to obtain the first plurality of data elements;
- compare the first plurality of data elements to the second plurality of data elements, wherein a correspondence between the first plurality of data elements and the second plurality of data elements constitutes validation of the first token; and
- transmit, to the first computing device, the results of the comparison indicating whether the verification computing device validated the first token.

* * * * *